United States Patent

[11] 3,583,506

| [72] | Inventor | Kenneth W. Preble<br>354 Katahdin Ave., Millinocket, Maine 04462 |
|---|---|---|
| [21] | Appl. No. | 838,587 |
| [22] | Filed | July 2, 1969 |
| [45] | Patented | June 8, 1971 |

[54] COMBINED AUXILIARY THROTTLE AND SAFETY SWITCH FOR SNOWMOBILE
9 Claims, 7 Drawing Figs.

[52] U.S. Cl. .................................................. 180/5,
180/9.22, 180/9.24, 180/77, 74/5
[51] Int. Cl. ....................................................... B62m 27/02
[50] Field of Search .......................................... 180/96,
104, 77, 82; 74/501, 501.2, 502

[56] References Cited
UNITED STATES PATENTS

| 2,701,023 | 2/1955 | Clough | 180/53 |
|---|---|---|---|
| 2,966,969 | 1/1961 | Morse | 74/501X |
| 3,090,460 | 5/1963 | Teetor | 74/502X |
| 3,186,252 | 6/1965 | Olandt | 74/502 |

OTHER REFERENCES
Arctic Cat-70- Advertizing brochure published by Arctic Enterprises Inc., Theif River Falls, Minn. 180/5

*Primary Examiner*—Richard J. Johnson
*Attorney*—Robert G. McMorrow

ABSTRACT: Extensible handles are carried on the handlebar and at the rear of a snowmobile and coupled to a linear actuator for operating both an ignition switch and a carburetor throttle valve with the handles acting as an auxiliary throttle and a dual acting safety device by sequentially deenergizing the ignition circuit and reduce sharply the flow of fuel from the carburetor to the engine.

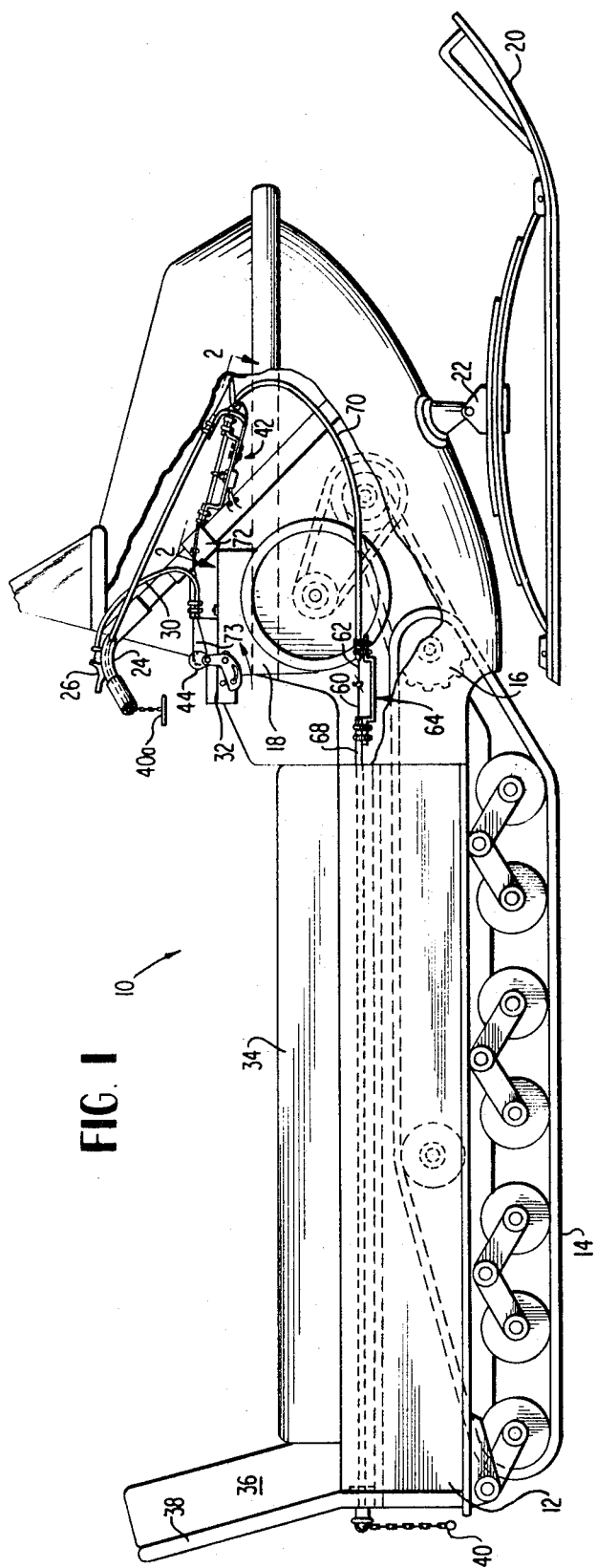
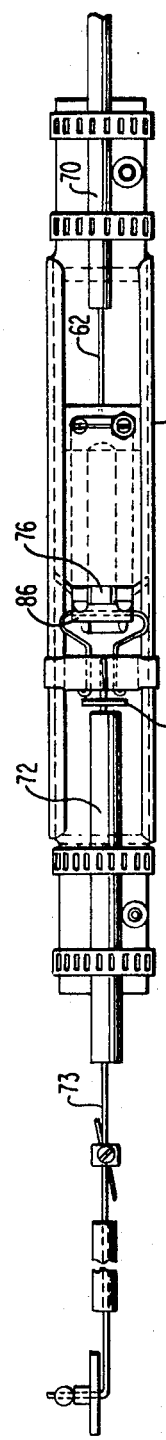
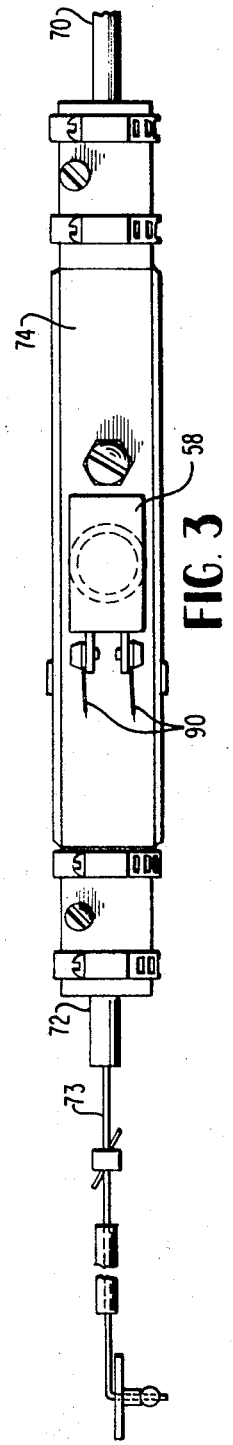
INVENTOR.
KENNETH W. PREBLE
BY
*Robert J. M. Morrow*
ATTORNEY

3,583,506

INVENTOR
KENNETH W. PREBLE
ATTORNEY

COMBINED AUXILIARY THROTTLE AND SAFETY SWITCH FOR SNOWMOBILE

BACKGROUND OF THE INVENTION

1. Field of the Invention

This invention relates to snowmobiles, and more particularly to a safety system for a snowmobile to ensure shutdown of the snowmobile under emergency conditions even where the operator falls from the vehicle during operation.

2. Description of the Prior Art

Snowmobiles comprise an elongated body carrying an underlying, driven endless track and one or more skis pivotably coupled to a steering handle at the forward end of the vehicle for allowing the snowmobile to move along a selected path during operation. One or more occupants sit behind the steering handle on a seat extending the major length of the body. At the front end of the snowmobile, there is provided an air-cooled engine of the internal combustion type which normally operates on a gasoline and oil mixture. In conventional fashion an electrical ignition system is provided for the engine and a throttle is carried preferably on one side of the handle with suitable mechanical linkage between the throttle and the throttle valve of the carburetor which controls the fuel and air mixture passing to the engine. The ignition system incorporates an ignition key normally carried by the dash beneath the handle in conventional vehicle fashion. During operation of the device, the ignition key is turned from the "on" to "off" position, the engine is started. The fuel supply to the engine, and thus the speed, is controlled by adjusting the throttle somewhat in the same manner as a motorcycle. Obviously, in the case of an emergency, the operator merely moves the throttle to idle position (or it automatically does so) and the ignition system if turned off by manually turning the ignition key to the "off" position thus opening the ignition switch contacts carried thereby. However, during emergency conditions, it may be that the operator is prevented from turning off the engine. For instance, if the vehicle is moving at some speed and the operator is thrown from the vehicle, the vehicle may itself continue to move although the operator is no longer aboard. If the operator is stuck in the snow, he must push the snowmobile, which is normally done by exerting force at the rear of the snowmobile, generally against a relatively strong, U-shaped tubular steel back brace just behind the rear cushion. Obviously, since he is displaced from the steering handle and the ignition switch, it requires another man to operate the vehicle while he attempts to push. In conventional snowmobiles, there is no possible way in which the person pushing the snowmobile can adjust the throttle and therefore the speed of the snowmobile.

Further, in times of a real emergency, it is desirable that the snowmobile engine be shut down completely and instantaneously. The mere turning off of the ignition may not necessarily result in shutdown of the engine. While under normal conditions, the engine will shut off upon opening of the ignition circuit, it is not unusual with air-cooled engines, especially those installed in snowmobiles, to overheat, whereupon the engine operates under a diesel mode without requiring an ignition spark. Attempts to employ a safety switch of some type as a part of the ignition circuit does not obviously solve all of the problems outlined above.

Summary of the Invention

The present invention is directed to an auxiliary control and safety system carried by the snowmobile and operable from the rear of the snowmobile body or from the handlebar, to selectively control the position of the carburetor throttle valve and to sequentially deenergize the ignition circuit and reduce fuel flow from the carburetor to the engine during an emergency.

The engine carries a throttle valve operated by a rotary cam, and the system of the present invention involves adjustably coupling the rotary cam to a linear actuator which in itself is connected to longitudinally movable handles extending from the snowmobile body at the rear thereof and the outer end of the steering handlebar. Further, an ignition switch is operatively coupled to the linear actuator such that by pulling of the handle rearwardly in a longitudinal direction, the linear actuator first moves the toggle switch operator of the ignition switch from closed to open position and continued rearward movement of the handle rotates the cam coupled to the throttle valve to a position where the carburetor throttle valve is closed to "idle" position. Preferably, each handle is of size easily grasped by an operator whose hands may be covered with heavy mittens and is carried at the end of a flexible chain which itself extends from an end plug fixed to cables independently coupled to the linear actuator.

BRIEF DESCRIPTION OF THE DRAWING

FIG. 1 is a side elevational view of a snowmobile incorporating the auxiliary throttle control and safety system of the present invention.

FIG. 2 is a top plan view in section of a portion of the snowmobile of FIG. 1 showing the linear actuator.

FIG. 3 is a bottom plan view of the portion of the apparatus shown in FIG. 2.

DESCRIPTION OF THE PREFERRED EMBODIMENT

Figure 4:
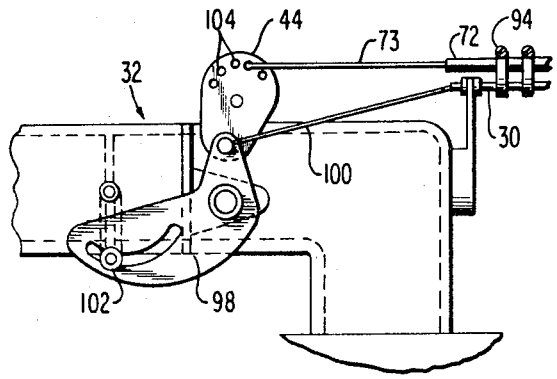
FIG. 4 is a side elevational view of a portion of the engine carburetor including the adjustable cam forming a part of the safety control system of the present invention.

Referring to the drawings, in FIG. 1 a snowmobile 10 comprises an elongated metal body 12 supporting in underlying fashion, an endless track 14 which is driven through sprocket member 16 by a gasoline engine indicated generally at 18 mounted at the forward end of the vehicle. In conventional fashion, there extends a pair of skis 20 for snowmobile steering purposes which are pivotably coupled by means 22 to the vehicle, the position of which is controlled by a steering mechanism including steering handlebar 24. On the steering handlebar 24 there is provided a conventional thumb throttle 26 which is pivotable to cause a Bowen wire actuator 30 or the like to vary the position of a throttle valve (not shown) associated with the carburetor 32, FIG. 4, to control the speed of the vehicle by varying the supply of fuel and air mixture to engine 18. The operator conventionally sits on seat 34 behind the handlebar 24 and one or more passengers may sit behind him, the rear passenger resting against rear cushion 36 in contact with a U-shaped rear bar 38. The dashboard just below the handle 24 normally carries an ignition key (not shown) which is held by an ignition switch allowing, by operation of the key, the ignition switch to be moved selectively from the "on" to "off" position. These elements are all conventional and thus by turning the ignition key, the engine may be started whose speed is controlled by selective positioning of the pivotable throttle 26 carried by handlebar 24. At the same time, the handlebar 24 is pivoted about an inclined axis for moving the skis 20 to the right or left for steering purposes.

The present invention is directed to a combined auxiliary throttle control and safety system involving five principal components. These components comprise; safety grip handles indicated generally at 40 and 40a which extend from the rear of the snowmobile and the end of handlebar 24 respectively, the linear actuator formed thereby, the double-automatic safety switch indicated generally at 42, FIG. 6, and the adjustable cam 44 for the carburetor, FIGS. 4 and 5.

Figure 6:
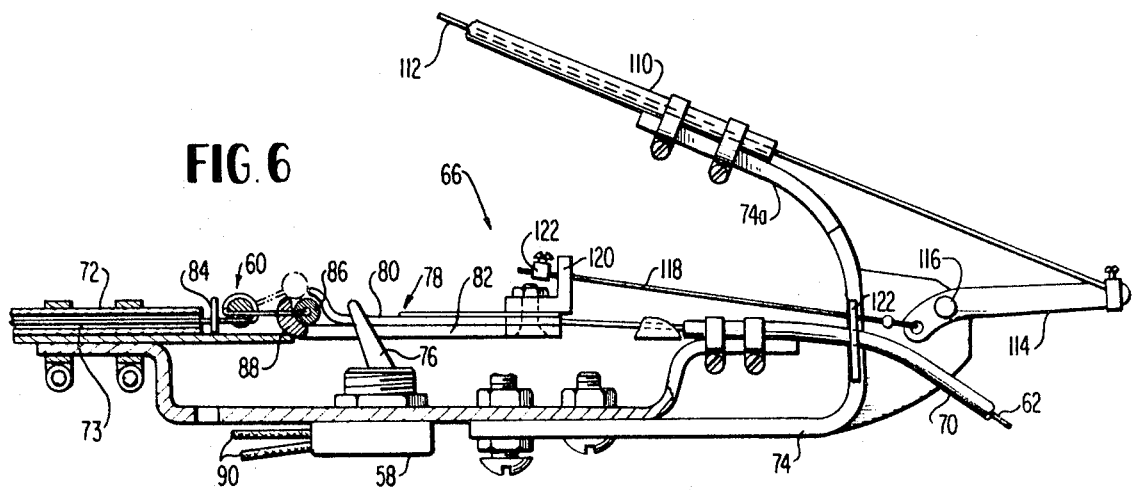
FIG. 6 is a side elevational view of a portion of the ignition switch and the linear actuator for operating the same.
Figure 7:
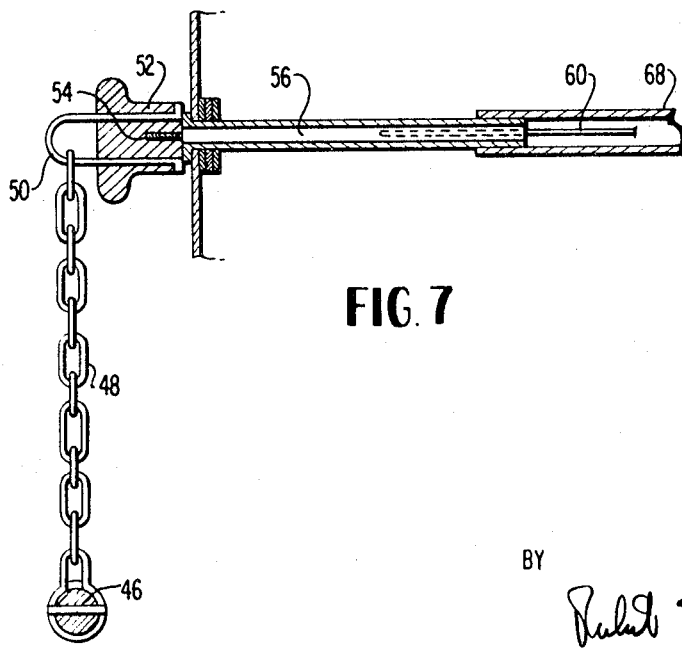
FIG. 7 is a side elevational view of a portion of the snowmobile shown in FIG. 1 showing the system operating rear handle.

Referring to FIG. 7, the handle or mitten operated safety grip 40 comprises a handle 46 is carried at the end of chain 48 in depending fashion, a U-shaped member 50 clamping the end of the chain to a wooden or metal plug 52 which is centrally bored and threaded at 54 to receive the threaded end of the first segment 56 of the linear actuator which couples the mitten safety grip 40 to the ignition toggle switch 58. Segments 60 and 62 are coupled together by adjustable clamping means 64 with the actuator segments in wire form or otherwise passing through fixed guide members in the form of copper tubes 68 and 70. A fixed shallow U-shaped support 74 supports the ignition switch 58 such that the toggle actuator 76 extends therefrom in the path of latch mechanism 78. The sliding latch mechanism 78 comprises two segments 80 and 82 which are slotted so that the toggle switch actuator 76 projects therethrough. The actuator segment 73 is provided with a stop 84 which limits travel from right to left in FIGS. 1 and 6 and is further provided with a terminal section 86 which falls over the clawlike end 88 of the sliding latch mechanism section 82 so as to be mechanically coupled to latch mechanism 78. Thus, not only are segments 73 and 62 adjustably connected, but they may be readily detached in the manner shown in FIG. 6, thus disconnecting the supplemental control from the carburetor but not from the ignition switch. The ignition switch 58 is provided with electrical leads 90 for incorporating the same in the ignition circuit.

Figure 5:
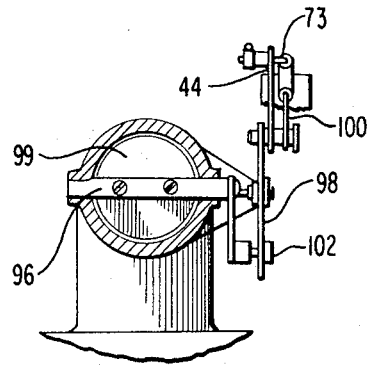
FIG. 5 is a front elevational view of the portion of the carburetor shown in FIG. 4.

A tube 72 carrying actuator wire segment 73 terminates in the vicinity of the carburetor 32 as indicated in FIGS. 4 and 5 with the end of the tube 72 being fixed to the carburetor by clamping means 94. As such, the extreme end of the actuator wire segment 73 is adjustably coupled to cam 44 which itself is rotatably carried by carburetor throttle valve shaft 96. The shaft also carries an arm 98 which receives the actuator wire 100 from thumb-operated throttle 26 via Bowden wire 30. The arm 98 carries a threaded setscrew 102 allowing adjustable connection between the throttle and the throttle valve 99 carried by carburetor 32. As mentioned previously, mounted to the same arm 98 is the adjustable cam 44, the cam carrying a plurality of circumferentially spaced holes 104 which receive the extreme outer end of the linear actuator wire segment 73. Both the adjustable cam 44 and the arm 98 independently control movement of the throttle valve. Movement of the manual throttle 26 results in rotation of shaft 96 about its axis and the throttle valve 99 which in this case will carry actuator segment 73 therewith to move the same relative to the fixed guide in the form of tube 72. Further, as a result of pulling on handle 40 or 40a, the linear actuator wire segment 73 moved to cause rotation of adjustable cam 44. Not only is the throttle thus independently moved to a new position but the throttle actuator wire 100 shifts relative to its Bowden wire casing resulting in shifting of the position of throttle 26 on the handlebar.

In addition to the use of the mitten operated safety switch 40 at the rear of the vehicle, a like effect by pulling on the mitten operated safety switch 40a at the extreme other end of the handlebar 24. Fixed support member 74 carries at its inner end, a frame extension 74a which curves upwardly at a slight angle and supports Bowden wire casing 110 carrying internally, core or actuator wire 112, the outer end of this wire is directly coupled to the safety mitten handle 40a while the inner end is fixed to pivotable lever 114. Lever 114 pivots about pin 116 and carries at its inner end actuator 118 which is guided by guides 120 and 122, guide 120 being carried by and forming a part of the sliding latch mechanism 78; stop member 122 is fixed to the end of Bowden wire 118. In operation, pulling of mitten operated handle 40a causes lever 114 to pivot counterclockwise about mounting pin 116 moving latch mechanism 78 independently of Bowden wire 62 and rear mitten operated safety handle 46. Note however, that mitten operated handle 40a may be moved freely in the opposite direction without disturbing the position of sliding latch mechanism 78. Of course, movement of the latch mechanism 78 from left to right also causes the throttle valve of the carburetor to change positions.

In operation, whether in an emergency or otherwise, the operator holds onto the bar 46 of handle 40 or handle 40a forming the mitten safety grip handles and pulls either to slows the vehicle to the desired lag speed, up to approximately two-thirds speed which has the effect of performing a speed control function. If the operator desires more speed, he may adjust the same from the rear by pushing on handle 46 or if he desires a slower speed, he pulls on the mitten safety grip handle 46. At approximately two-thirds normal engine speed (which point may be readily adjusted by primary and secondary adjustment connectors 66 and 64, respectively), the toggle is moved to the right of "on" position and approaches the fully "off" position. The ignition switch 58 is "on" in the position of FIG. 6. The fully "off" position is a position in which the latch mechanism 78 is pulled to the extreme right in FIG. 6 and throttle valve carried by throttle pin or shaft 96 of the carburetor moved to nearly closed or "idle" position limiting the fuel and air mixture which reaches the engine. The three positions or phases are accomplished by one continued outward movement of the safety grip handle 46 and control wire segments 56, 60 and 62. If the double-automatic safety switch 58 has been disconnected it is readily reconnected by merely pushing inwardly on the mitten safety grip handle and/or plug 52 coupled thereto. The entire device operates in any installed position but preferably with the safety grip handle 46 at the rear of the machine, however, movement of the safety grip handle 46 must be outwardly or away from the machine because of weather conditions, operating conditions and safety factor. Due to the connection between the rotary cam 44 and the safety grip handle 46 any movement of the same causes rotation of the cam 44 and adjustment of engine speed (fuel-air mixture reaching the engine.) If the snowmobile is stuck, and if the operator is pushing at the rear and the snowmobile becomes unstuck rather quickly or if the person pushing should fall (not unusual when the operator is standing in 3 feet of snow), the operator simply holds onto the mitten safety grip handle 46 which in turn actuates the double-automatic safety switch to shut off the motor and sequentially, idle down the throttle valve be rotating the cam to its fully rotated position. The safety and control arrangement further facilitates adjustment of the snowmobile lag which is required after multiple hours of use.

In summary, the combined safety and control system operable by the operator at the rear of the snowmobile performs, in effect, six different functions; the increase of fuel supply, the decrease of fuel supply, the disconnection of the electrical source from the ignition circuit, the near disconnection of the fuel supply from the engine, the emergency shutoff of the engine and ignition circuit, and the resetting of both the ignition circuit and the fuel control in the carburetor by pushing in on the "mitten" safety grip handle 46 or its associated plug 52.

claim I claim: is:

1. In a snowmobile having an elongated body and underlying endless track for moving the same, pivotable skis at the forward end for steering the snowmobile, an internal combustion engine for driving said track, a carburetor for controlling delivery of fuel to said engine, a throttle for controlling carburetor operation, and an ignition system including a two position ignition switch for said engine, the improvement comprising: manually operable auxiliary means carried by the snowmobile and operatively coupled to said throttle and said ignition switch for sequentially deenergizing said ignition and shutting off the flow of fuel from the carburetor to the engine.

2. The snowmobile as claimed in claim 1 wherein said means for shutting off the flow of fuel from the carburetor to the engine includes cam means carried by said carburetor and fixedly coupled to the carburetor throttle valve, and said auxiliary means carried by the snowmobile comprises a longitudinally movable handle carried by said body at the rear thereof and means for operatively coupling said handle to said cam to vary the position of said carburetor throttle valve.

3. The snowmobile as claimed in claim 2 wherein said means for operatively connecting said handle to said cam comprises an actuator wire, said ignition switch means comprises a toggle switch fixedly carried by said elongated body, sliding latch mechanism adjustably coupled to said actuator wire and in operative association with said toggle switch whereby movement of said handle away from the rear of said snowmobile body causes said toggle switch to move from "on" to the "off" position and to simultaneously rotate said cam means.

4. The snowmobile as claimed in claim 3 further comprising means carried by said sliding latch mechanism to ensure movement of said toggle switch from said "off" position to said "on" position when said handle is pushed inwardly in the direction of the snowmobile body.

5. The snowmobile as claimed in claim 3 further comprising means for adjusting the position of said sliding latch mechanism with respect to said handle, and said actuator wire with respect to said rotating cam.

6. The snowmobile as claimed in claim 3 wherein said actuator wire protrudes from the rear end of said snowmobile body, a plug is threadedly coupled to the outer end of said actuator wire, and a chain couples said handle to the end of said plug.

7. The snowmobile as claimed in claim 6 wherein said actuator wire comprises multiple sections and said snowmobile further comprises means for readily disconnecting said actuator wire between said cam means and said toggle switch.

8. The snowmobile as claimed in claim 3 further including a second longitudinally movable handle carried by the snowmobile steering handlebar and operatively coupled to said sliding latch mechanism for operation of the same independently of said first handle.

9. In a vehicle having an elongated body and an underlying endless track for moving the same, an internal combustion engine for driving said track, a carburetor for controlling delivery of fuel to said engine, a throttle for controlling carburetor operation, and an ignition system including a two position ignition switch for said engine, the improvement comprising: manually operable auxiliary means carried by the vehicle and operatively coupled to the carburetor throttle and the two-position ignition switch for sequentially deenergizing the ignition system and shutting off the flow of fuel from the carburetor to the engine.